United States Patent
Boulanger et al.

(10) Patent No.: US 10,070,074 B2
(45) Date of Patent: Sep. 4, 2018

(54) VECTOR PROCESSING ARCHITECTURES FOR INFRARED CAMERA ELECTRONICS

(71) Applicant: FLIR Systems, Inc., Wilsonville, OR (US)

(72) Inventors: Pierre Boulanger, Goleta, CA (US); Randy Roberts, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/017,448

(22) Filed: Feb. 5, 2016

(65) Prior Publication Data

US 2016/0156855 A1    Jun. 2, 2016

Related U.S. Application Data

(63) Continuation of application No. PCT/US2014/049828, filed on Aug. 5, 2014.

(Continued)

(51) Int. Cl.
*G01J 5/00* (2006.01)
*H04N 5/33* (2006.01)
(Continued)

(52) U.S. Cl.
CPC .......... *H04N 5/33* (2013.01); *G06T 1/20* (2013.01); *H04N 5/76* (2013.01)

(58) Field of Classification Search
CPC .......... G06F 17/5054; G08G 1/04; G06T 1/20
See application file for complete search history.

(56) References Cited

U.S. PATENT DOCUMENTS

| 5,416,711 A | * | 5/1995 | Gran | G08G 1/04 340/905 |
| 2002/0166004 A1 | * | 11/2002 | Kim | G06F 13/28 710/22 |

(Continued)

OTHER PUBLICATIONS

Ro et al., "Threat mediation via a real-time stereoscopic catadioptric omnivision system", article, May 2, 2006, 10 pages, vol. 6231— Unattended Ground Sea and Air Sensor Technologies and Applications VII, SPIE , URL: http://spie.org/Publications/Proceedings/Paper/10.1117/12.668500.

(Continued)

*Primary Examiner* — Kiho Kim
(74) *Attorney, Agent, or Firm* — Haynes & Boone, LLP

(57) ABSTRACT

Systems and methods are disclosed herein to provide infrared imaging systems with improved electronics architectures. In one embodiment, an infrared imaging system is provided that includes an infrared imaging sensor for capturing infrared image data and a main electronics block for efficiently processing the captured infrared image data. The main electronics block may include a plurality of vector processors each configured to operate on multiple pixels of the infrared image data in parallel to efficiently exploit pixel-level parallelism. Each vector processor may be communicatively coupled to a local memory that provides high bandwidth, low latency access to a portion of the infrared image data for the vector processor to operate on. The main electronics block may also include a general-purpose processor configured to manage data flow to/from the local memories and other system functionalities. The main electronics block may be implemented as a system-on-a-chip.

17 Claims, 5 Drawing Sheets

Related U.S. Application Data

(60) Provisional application No. 61/862,923, filed on Aug. 6, 2013.

(51) Int. Cl.
    *G06T 1/20*     (2006.01)
    *H04N 5/76*     (2006.01)

(56) References Cited

U.S. PATENT DOCUMENTS

2006/0266942 A1     11/2006    Ikeda
2010/0302376 A1     12/2010    Boulanger et al.

OTHER PUBLICATIONS

Meijer et al., "Multiple View Camera Calibration for Localization", article, Sep. 1, 2007, 7 pages, First ACM/IEEE Conference on Distributed Smart Cameras, ICDSC, Vienna, Austria URL: https://www.seeingwithsound.com/thesis/icdsc07_meijer_etal.pdf.

Nurpinar Akdeniz, "Digital Signal Processor (DSP) Accelerated Image Enhancement for Infrared Imaging Systems", Master's Thesis, Jul. 1, 2011, 63 pages, Atilim University, Ankara, Turkey URL: http://acikarsiv.atilim.edu.tr/browse/402/410968.pdf.

Anonymous, "Cell (microprocessor)", web page, Jul. 23, 2013, 16 pages, Wikipedia, internet, URL: https://en.wikipedia.org/wiki/Cell_(microprocessor).

Anonymous, "Intel 1860", 7 pages, [online], [retrieved on Nov. 17, 2016]. Retrieved from the Internet: <URL: https://en.wikipedia.org/w/index.php?title=Intel_i860&oldid=565851456>.

\* cited by examiner

VECTOR PROCESSING ARCHITECTURES FOR INFRARED CAMERA ELECTRONICS

CROSS-REFERENCE TO RELATED APPLICATION

This application is a continuation of International Application No. PCT/US2014/049828 filed Aug. 5, 2014 and entitled "VECTOR PROCESSING ARCHITECTURES FOR INFRARED CAMERA ELECTRONICS", which is hereby incorporated by reference in its entirety.

International Application No. PCT/US2014/049828 claims priority to and the benefit of U.S. Provisional Patent Application No. 61/862,923 filed Aug. 6, 2013 and entitled "VECTOR PROCESSING ARCHITECTURES FOR INFRARED CAMERA ELECTRONICS," which is hereby incorporated by reference in its entirety.

TECHNICAL FIELD

One or more embodiments of the invention relate generally to electronics for imaging devices and more particularly, for example, to electronics architectures for infrared cameras.

BACKGROUND

Infrared imaging systems, such as infrared cameras, are increasing in popularity. As the cost to produce infrared imaging sensors decreases and the image quality improves, infrared imaging devices are increasingly finding a wide array of applications. Modern infrared imaging systems typically include associated electronics to perform "pixel processing" to compensate for various types of non-uniformities and distortions that may be introduced by infrared imaging sensors and other components. Such pixel processing requires significant processing speed, especially for real-time applications such as infrared cameras where videos/images need to be captured without significant latency or other delays. However, such demand for processing speed often leads to unfavorable cost, size, and/or power requirements for infrared imaging systems with conventional image processing electronics architectures.

For example, typical infrared camera electronics include a programmable logic device (PLD) such as a field programmable gate array (FPGA) to perform pixel processing. However, because PLDs are programmed using logic languages and have poor logic density compared to dedicated circuits, they are not well suited for implementing complex pixel processing algorithms such as resolution enhancement or other high-level pixel processing algorithms, or high-level functions such as networking, compression, user interface, file system management, or other functions of infrared cameras. While some conventional infrared camera electronics include a general-purpose processor (e.g., a digital signal processor (DSP)) to perform such high-level functions, DSPs or other types of general-purpose processor typically cannot efficiently provide the processing speed for types of pixel processing desired in modern infrared cameras. That is, a typical general-purpose processor either cannot meet the processing speed requirement or meets the processing speed requirement only with undesirably large power consumption and heat generation (e.g., running at high frequency). Some conventional infrared camera electronics include hardwired electronics (e.g., custom fixed circuitry or chip) for pixel processing. However, hardwired electronics are more costly to implement, and more importantly do not offer the programmability or configurability to update or configure pixel processing operations as desired.

These difficulties are exacerbated by a growing demand for infrared imaging system electronics to provide video analytics, video compression, image enhancements, and other image/video processing, as well as the need to handle other system functionalities such as user interface, networking, image storage, and peripheral interface functionalities. While some conventional infrared camera electronics aim to meet the increasing demand for processing speed by combining a general-purpose processor, a PLD, a peripheral controller, and other components, such a combination often results in increased cost, size, weight, and power requirements.

Consequently, conventional infrared imaging system electronics are generally costly, inefficient, and unable to provide types of image/video processing desired for modern infrared imaging systems, while requiring significant circuit board area and power. Accordingly, there is a need for improved electronics architectures for infrared imaging systems.

SUMMARY

Systems and methods are disclosed herein for various embodiments to provide infrared imaging systems with improved electronics architectures. In one embodiment, an infrared imaging system is provided that includes an infrared imaging sensor for capturing infrared image data and a main electronics block for efficiently processing the captured infrared image data. The main electronics block may include a plurality of vector processors each configured to operate on multiple pixels of the infrared image data in parallel to efficiently exploit pixel-level parallelism. Each vector processor may be communicatively coupled to a local memory that provides high bandwidth, low latency access to a portion of the infrared image data for the vector processor operates on. The main electronics block may also include a general-purpose processor configured to manage data flow to/from the local memories and other system functionalities. The main electronics block may be implemented as a system-on-a-chip (SoC), further including a peripheral interface block.

In another embodiment, an infrared imaging system may include an infrared imaging sensor configured to provide infrared image data comprising a plurality of pixels, and a main electronics block configured to receive the infrared image data, the main electronics block comprising at least one vector processor configured to operate on multiple pixels in parallel according to vector instructions associated with the at least one vector processor, wherein the multiple pixels are selected from the plurality of pixels of the infrared image data.

In another embodiment, a method of providing infrared images may include converting received infrared energy into infrared image data comprising a plurality of pixels, providing, to at least one vector processor, multiple pixels selected from the plurality of pixels of the infrared image data, and operating on the multiple pixels in parallel at the at least one vector processor according to vector instructions associated with the at least one vector processor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
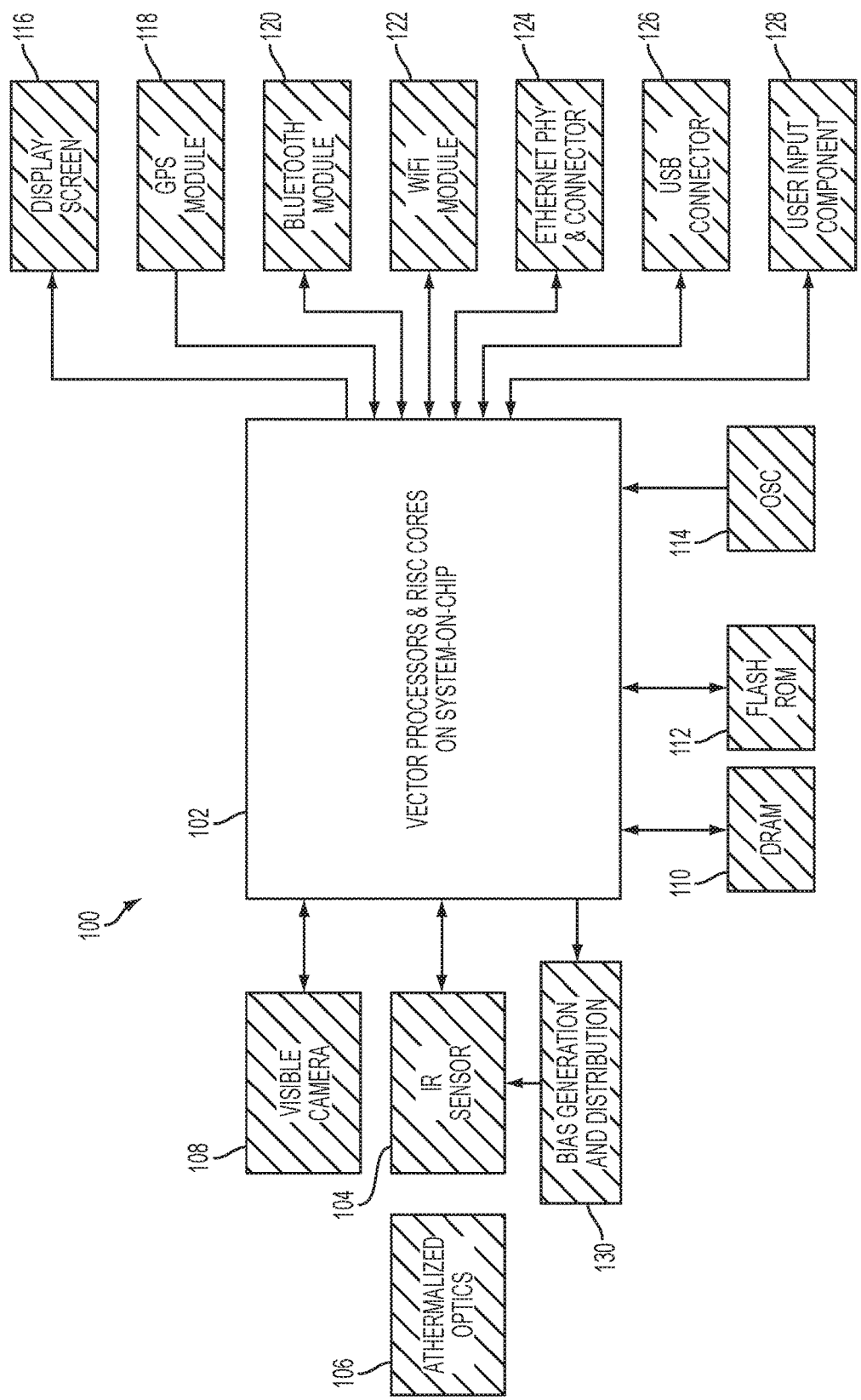
FIG. 1 illustrates a block diagram of a system for capturing and processing images in accordance with an embodiment of the disclosure.

A video (or image) processing chain (e.g., one or more operations to process raw video/image data captured by an imaging sensor to produce a usable output video/image) for digital imaging devices such as infrared cameras may by nature have a high potential for data-level parallelism which is unexploited in conventional digital imaging devices. For example, many operations of a typical infrared camera video processing chain involve repetitions of a same independent pixel-level operation for every pixel in a video image frame. In addition to basic video processing chains, other more complex video processing and video analytics algorithms may also in part involve a pixel-level operation that is repeated independently for every pixel in a video image frame. Such repeating operations for multiple data elements (e.g., multiple pixels) can potentially be carried out in parallel.

Techniques are disclosed herein to provide efficient, scalable, flexible, yet cost-effective infrared camera electronics architectures that can beneficially exploit such data-level (e.g., pixel-level) parallelism. According to various embodiments of the disclosure, an infrared camera may include at least one vector processor that performs "single instruction multiple data" (SIMD) operations, operating on multiple data elements (e.g., a vector consisting of multiple data elements) in parallel. More specifically, the vector processor may be adapted to perform same operations on multiple pixels of a digital image (e.g., a video frame) in parallel as further described herein to exploit pixel-level parallelism that may be inherent in at least some video processing and analytics operations. In some embodiments, the vector processor may include a plurality of vector registers adapted to temporarily store multiple data elements (e.g., multiple pixels) to be operated on or produced by the vector processor.

In some embodiments, a digital imaging device such as an infrared camera may include a plurality of such vector processors each independently executing SIMD instructions on multiple pixels. The multi-vector processor architecture may enable scalable and flexible image processing electronics capable of handling demanding video/image processing and analytics. For example, a basic video processing chain (e.g., including basic pixel correction operations) may be augmented with more advanced video processing (e.g., including distortion correction, image blending, resolution enhancement, encoding, and/or others) to define an expanded video processing pipeline, whose pipeline stages may be distributed and coordinated over multiple vector processors according to the desired enhancement/correction and available processing power. In another example, pixel-level operations for video analytics or other processing that is not part of the video output chain (or pipeline) may be executed in some vector processors while the video processing chain (or pipeline) is being concurrently executed in other vector processors. In that sense, the multi vector processor configuration can take advantage of yet another level of parallelism (e.g., thread-level parallelism).

The multi-vector processor architectures disclosed herein may also provide imaging device electronics that can scale well with an increase in image/video resolution (e.g., as the imaging sensor technology advances to provide higher pixel count) and/or an increase in frame rate. By assigning more of the multiple vector processors to handle operations in critical paths, the increased demand for pixel-processing power due to a higher resolution and/or frame rate may be accommodated without a need to redesign the imaging device electronics with more powerful processors. For example, an increase in a thermal imaging sensor resolution from 640 by 512 pixels to 1280 by 1024 pixels (i.e., a four-fold increase in pixel count) may be accommodated by increasing the number of vector processors handling the video processing chain from two vector processors to eight vector processors.

According to various embodiments, there may be provided one or more local memories communicatively coupled to and accessible by the vector processors. In some embodiments, each of the one or more local memories may be associated with one vector processor. In some embodiments, each of the one or more local memories may be shared by more than one vector processors. Each local memory may be adapted to store data to be consumed by the associated vector processor(s). In this regard, each local memory may be adapted to store a group of pixels (e.g., pixels in one or more lines of video/image) pre-transferred (e.g., forwarded) from a global memory, other local memories, and/or other storage, so that a selected group of pixels may be ready in the local memory for accessing and processing by the associated vector processor(s). Other data to be stored in the local memories may include corresponding portions of calibration terms, bad pixel maps, pixel deltas and weights for distortion correction, color look up tables (LUTs), intensity transform tables (ITTs) and/or other data to be used in processing the selected group of pixels. In some cases, each local memory may be adapted to store data that is produced by the associated vector processor(s) and to be transferred to the global memory, other local memories, and/or other storage. By providing local data access and storage for the vector processors, the local memories may enable still faster and more efficient processing of pixel data by the vector processors as further described herein for various embodiments.

In various embodiments, there may also be provided a general-purpose processor to support vector processing configuration and other management functionalities for the digital imaging device. In general, the general-purpose processor may be implemented with a scalar processor such as a reduced instruction set computing (RISC) scalar processor or a microcontroller, but other appropriate circuitry implementations such as an application specific integrated circuit (ASIC) implementation or a programmable logic device (PLD) implementation are also contemplated. In various embodiments, the general-purpose processor may be adapted to handle overall system configuration management, vector processing configuration management, data and memory management, higher-level processing portions (e.g., non-vectorizable operations) of video analytics, operating system functions (e.g., including real-time operating system (RTOS) scheduling, network stacks, peripheral drivers, file system handling, and/or other OS functions). For example, the data forwarding to the local memories of the vector processors may be handled by the general-purpose processor setting up direct memory access (DMA) transfers in some embodiments. In this regard, some embodiments of the digital imaging device may also include one or more DMA engines controllable by the general-purpose processor.

In various embodiments, the digital imaging device (e.g., an infrared camera) may further include other circuitry to control and interface with various components of the digital imaging device. In one example, such other circuitry may include sensor interfaces for imaging sensors (e.g., thermal imaging sensor and/or visible light imaging sensor), a dynamic random access memory (DRAM) controller, and various peripheral controllers (e.g., to provide interface logic for a USB connector, Ethernet module, display, GPS module, Bluetooth module, flash memory, serial peripheral interface (SPI) bus, and/or inter-IC (I2C) bus). In some embodiments, the herein described vector processors, local memories, general-purpose processor, DMA engines, imaging sensor interfaces, DRAM controller, and various peripheral controllers may be integrated into a single system-on-a-chip (SOC). The system-on-a-chip implementations of the herein described imaging device electronics architectures may increase reliability, reduce cost, and permit a smaller package by reducing the number of discrete components needed to implement digital imaging devices.

FIG. 1 shows a block diagram illustrating a system 100 (e.g., an infrared camera) for capturing and processing images in accordance with one or more embodiments of the disclosure. System 100 may represent for example a digital imaging device, such as a camera, to capture and process images, such as video images. System 100 may represent any type of infrared camera adapted to detect infrared radiation, convert the detected infrared radiation into infrared image data, and process the infrared image data to provide an output such as infrared video images or other data based on the infrared image data. System 100 may include a standalone portable device (e.g., a hand-held infrared camera, a vehicle-mountable infrared camera, or an infrared camera for other mobile applications) or an imaging module that may provide imaging capabilities (e.g., infrared imaging capabilities) to a host device (e.g., a mobile phone, tablet device, a laptop, or other devices). System 100 may also be a non-mobile installation that may require captured images to be processed, stored, and/or displayed remotely and may include distributed components adapted to communicate over a network (e.g., wireless and/or wired networks, including the Internet).

In various embodiments, system 100 may comprise a main electronics block 102, an infrared imaging sensor 104, an infrared optics block 106, a visible light imaging sensor 108, a global memory 110, a non-volatile memory 112, and/or a clock circuit 114. In general, system 100 implementing an infrared camera may comprise infrared imaging sensor 104. For some embodiments of system 100 implementing an infrared camera, visible light imaging sensor 108 may be optional or may be included and can be utilized to complement infrared imaging sensor 104, for example to provide fused video images of both infrared and visible light image data.

Main electronics block 102 may include various circuits and components configured to provide image processing and system control (e.g., camera control) functionalities for system 100. For example, main electronics block 102 may comprise one or more vector processors to implement a vector processing electronics architecture further described herein. For some embodiments, the various circuits and components of main electronics block 102 may be integrated into a single system-on-a-chip implementation. Main electronics block 102 may include a circuit adapted to interface with infrared imaging sensor 104 to control and receive infrared image data captured by infrared imaging sensor 104. For embodiments that include visible light imaging sensor 108, main electronics block 102 may include a circuit adapted to interface with visible light imaging sensor 108.

Infrared imaging sensor 104 may comprise, in various embodiments, any appropriate type of multi-pixel infrared sensor for capturing infrared imaging data (e.g., still image data and/or video data) representative of a scene viewed by infrared imaging sensor 104 via infrared optics block 106. For example, infrared imaging sensor 104 may include a focal plane array (FPA) of bolometers or other appropriate infrared detectors with an associated readout integrated circuit (ROIC), the ROIC including control circuitry, timing circuitry, row and column addressing circuitry, amplifiers, analog-to-digital converters, and other circuitry adapted to output infrared image data that is representative of infrared radiation detected by the bolometers or other appropriate infrared detectors. For example, the infrared image data captured and output by the FPA and ROIC may be provided to main electronics block 102 as described herein.

For some embodiments, bias generation and distribution circuitry 130 may be provided to control (e.g., by providing control bits) variable components such as variable resistors, digital-to-analog convertors, and/or biasing circuitry of the FPA or ROIC according to conventional techniques. Bias generation and distribution circuitry 130 may receive various bias correction data words determined by appropriate components of main electronics block 102 according to conventional methods. Further examples of FPAs and ROICs that may be utilized to implement infrared imaging sensor 104 may be found in U.S. Pat. No. 6,028,309 entitled "Methods and Circuitry for Correcting Temperature-Induced Errors in Microbolometer Focal Plane Array," U.S. Pat. No. 6,812,465 entitled "Microbolometer Focal Plane Array Methods and Circuitry," U.S. Pat. No. 7,034,301 entitled "Microbolometer Focal Plane Array Systems and Methods," U.S. Pat. No. 7,679,048 entitled "Systems and Methods for Selecting Microbolometers Within Microbolometer Focal Plane Arrays," and U.S. Pat. No. 8,080,794 entitled "Microbolometer Heating Compensation Systems and Methods," which are all incorporated herein by reference in their entireties.

Infrared optics block 106 may represent one or more optical elements such as infrared-transmissive lenses, infrared-transmissive prisms, infrared-reflective mirrors, infrared fiber optics, and/or other elements for suitably collecting and routing infrared radiation from a scene to an FPA of infrared imaging sensor 104. In one embodiment, the one or more optical elements of infrared optics block 106 may be athermalized, that is, capable of maintaining their optical properties over varying temperatures. For some embodiments, infrared radiation passed through infrared optics block 106 and detected by infrared imaging sensor 104 may include radiation in a thermal infrared waveband (e.g., wavelengths between 3.5 and 20 μm). In other words, infrared optics block 106 may be adapted to transmit and infrared imaging sensor 104 may be responsive to mid wave infrared (MWIR) radiation, long wave infrared (LWIR) radiation, and/or other thermal imaging bands, or other infrared imaging bands, as may be desired in particular implementation.

Visible light imaging sensor 108 may be implemented with any suitable type of conventional imaging sensor for capturing visible light images and outputting visible light image data. For example, charge-coupled device (CCD) sensors, complementary metal-oxide semiconductor (CMOS) sensors, or other variations of such sensors (including their associated output circuitry) may be utilized to implement visible light imaging sensor 108. As such, visible light imaging sensor 108 is mainly responsive to visible light, but may also be responsive to a portion of other wavebands (e.g., light in the near infrared spectrum of 0.7-1.0 μm wavelengths). For embodiments that include visible light imaging sensor 108, the visible light image data captured and output by visible light imaging sensor 108 may be provided to main electronics block 102 as described herein.

Global memory 110 may be implemented with a suitable memory such as a DRAM, and adapted to store data that is utilized in processing of image data or control of system 100 by main electronics block 102. For example, global memory 110 may store infrared image data received by main electronics block 102 from infrared imaging sensor 104, as well as processed image data at various stages of processing by main electronics block 102. Implementations of global memory 110 may include a double data rate version 3 synchronous DRAM (DDR3 SDRAM), a graphic DDR version 5 SDRAM (GDDR5 SDRAM), or other appropriate types of DRAM as available and/or desired for particular applications.

Non-volatile memory 112 may be adapted to store various types of previously determined data for use in processing of image data or control of system 100 by main electronics block 102. Such previously determined data may include, but not limited to, calibration terms (e.g., including gain terms, offset terms, and other terms obtained through a calibration process to use in perform a non-uniformity correction (NUC) of infrared imaging sensor 104), bad pixel maps, pixel deltas and weights for distortion correction, look up tables (LUTs) for color, polarity, and gamma corrections, camera configuration data, and/or other data as appropriate. Non-volatile memory 112 may also serve as a non-transitory computer-readable medium that stores machine instructions for system 100 to perform various processes described herein. In some cases, at least some of the data stored in non-volatile memory 112 may be transferred (e.g., copied) to global memory 110 or other memories prior to being utilized. Although a flash ROM is shown for non-volatile memory 112 in FIG. 1, non-volatile memory 112 may represent one or more suitable non-volatile memories such as a flash ROM, one-time programmable (OTP) memory, EPROM, EEPROM, and/or hard disk drive depending on particular implementation applications.

Clock circuit 114 may be adapted to provide one or more timing or clock signals for various components (e.g., main electronics block 102) of system 100. In one embodiment, clock circuit 114 may be implemented with an oscillator (OSC) and associate control circuitry.

Depending on specific embodiments, system 100 may further comprise various peripheral components such as a display screen 116, a GPS module 118, a personal area networking (PAN) module 120 (e.g., a Bluetooth® module), a wireless communication module 122 (e.g., a Wi-Fi™ module), a wired communication module 124 (e.g., an Ethernet module), a USB connector module 126, a user input component 128, and/or other peripherals. Display screen 116 may include an image display device (e.g., a liquid crystal display (LCD)) or various other types of generally known video displays or monitors. Main electronics block 102 may include suitable interface logic to transmit appropriate video signals for displaying desired images (e.g., processed infrared video images) on display screen 116. GPS module 118 may comprise a GPS receiver for receiving GPS signals and associated electronics adapted to provide geopositional information associated with system 100 to main electronics block 102. Main electronics block 102 may include suitable interface logic to receive the geopositional information from GPS module 118.

PAN module 120 may include one or more appropriate wireless transceivers and control circuitry to implement the Bluetooth® standard, the ZigBee™ standard, or other standard or proprietary short range wireless communication protocol. Wireless communication module 122 may include one or more appropriate wireless transceivers and control circuitry to implement a wireless LAN standard (e.g., the IEEE 802.11 WiFi™ standards), wireless broadband standard (e.g., the IEEE 802.16 WiMax™ standards), cellular data communication standard (e.g., HSPA+, LTE, or other standards based on cellular networks), and/or other standard or proprietary wireless communication protocols having radio frequency (RF), microwave frequency (MWF), and/or infrared frequency (IRF) carriers. Wired communication module 124 may include appropriate hardware adapted to provide connections for wired communication over an Ethernet network, a digital subscriber line (DSL), a public switched telephone network (PSTN), an optical fiber network, a power-line network, or other appropriate wired networking media. In various embodiments, wired communication module 124 may include appropriate physical connectors to plug into such wired networking media. In some embodiments, wired communication module 124 may further include appropriate interface logic to implement physical layer protocols (PHYs) for wired networking. USB connector module 126 may be included in some embodiments and may be implemented with appropriate hardware (e.g., USB-compliant connectors and accompanying circuitry) adapted to support communication with other USB-compliant devices.

In various embodiments, main electronics block 102 may include appropriate interface logic adapted to transmit processed image data (e.g., infrared video output) or other data based on captured images (e.g., radiometric temperature data) to external components via PAN module 120, wireless communication module 122, wired communication module 124, and/or USB connector module 126. According to some embodiments, main electronics block 102 may be configured to send and/or receive control commands remotely via networking module 120, wireless communication module 122, and/or wired communication module 124. For example, commands may be received from a remote monitoring station to control a surveillance camera implementation of system 100.

User input component 128 may include one or more user actuated devices, such as push buttons, slide bars, rotatable knobs, a keyboard, or other appropriate input devices, that are adapted to generate one or more input signals in response to user's inputs. In some embodiments, user input component 128 may be integrated with display screen 116, for example, as a touch screen overlaid on display screen 116 configured to display one or more generated images of user actuated mechanisms (e.g., images of buttons, knobs, sliders, or other images). Main electronics block 102 may be configured to sense input signals generated via user input component 128, and respond to the sensed input signals.

In various embodiments, one or more components of system 100 may be combined and/or implemented or not, as desired or depending on application requirements, with system 100 illustrating various representative functional blocks of a digital imaging device such as an infrared camera. For example, various peripheral components of system 100 such as GPS module 118, wireless communication module 122, wired communication module 124 may be combined and integrated as part of main electronics block 102 which represents a group of various circuits and components configured to provide image processing and system control functionalities. In another example, one or more components shown as part of main electronics block 102 may be implemented as one or more discrete components of system 100.

Figure 2:
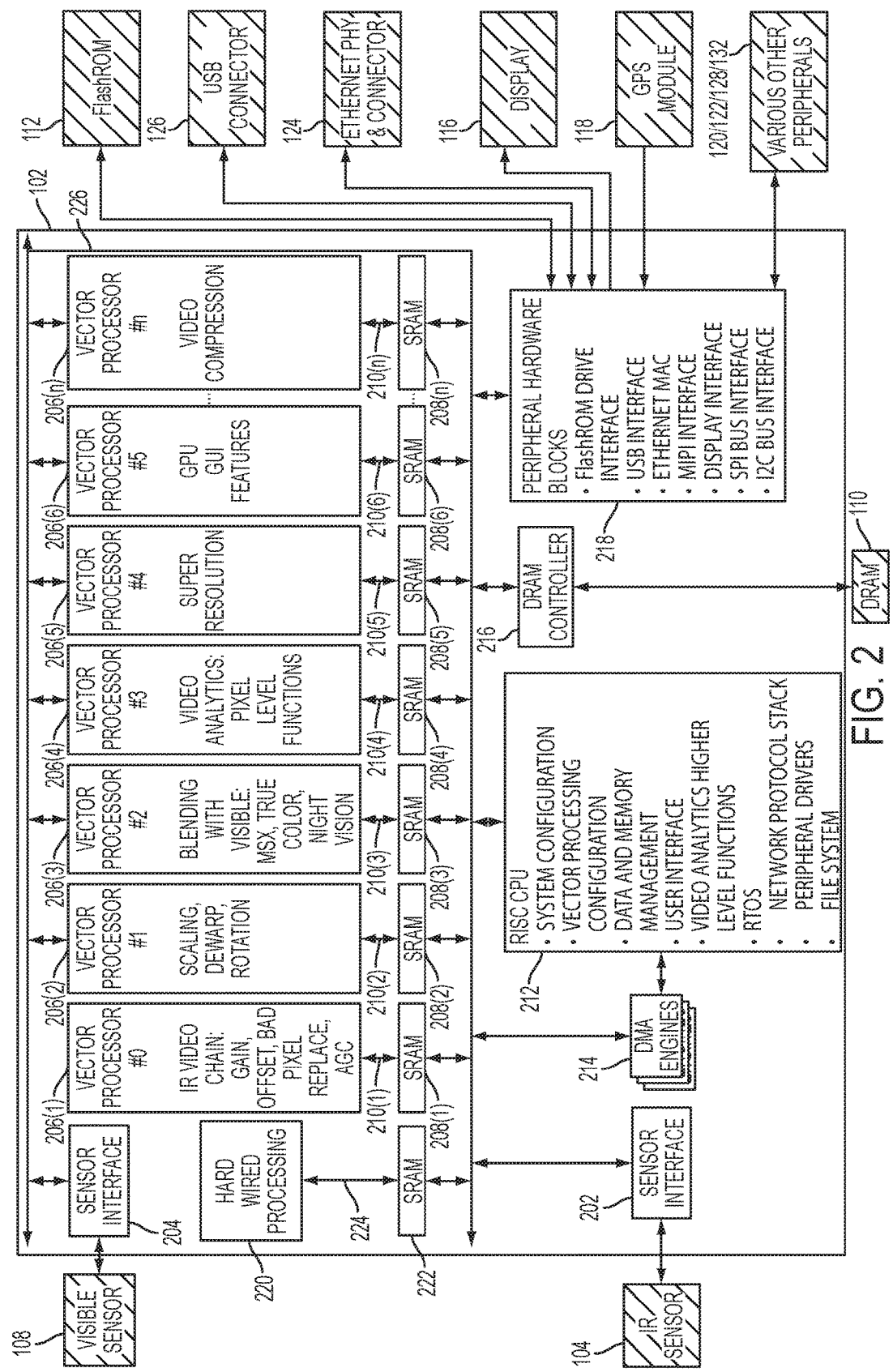
FIG. 2 illustrates a block diagram of a portion of the system of FIG. 1, in accordance with an embodiment of the disclosure.

Referring now to FIG. 2, a block diagram of a portion of system 100 is shown to illustrate various components of main electronics block 102 in accordance with an embodiment of the disclosure. As discussed above with reference to FIG. 1, main electronics block 102 may comprise various circuits and components configured to receive image data and to perform various image processing operations on the received image data. For example, in various embodiments, infrared image data captured by infrared imaging sensor 104 and/or visible light image data captured by visible light imaging sensor 108 may be received by main electronics block 102 to be processed.

In this regard, main electronics block 102 may include one or more sensor interface circuits for interfacing with one or more imaging sensors of system 100. More specifically for some embodiments, sensor interface circuit 202 may be provided and adapted to receive infrared image data captured by infrared imaging sensor 104 for processing by other components and circuits of main electronics block 102. For example, sensor interface circuit 202 may be adapted to receive, convert, and/or buffer output signals from infrared imaging sensor 104 (e.g., provided by infrared imaging sensor 104 in form of analog or digital signals depending on implementations) according to appropriate timing and format, where the output signals may be indicative of the infrared image data captured by infrared imaging sensor 104. In some embodiments, sensor interface circuit 202 may also be utilized to transmit commands (e.g., control bits) according to appropriate format and timing to infrared imaging sensor 104 and/or bias generation and distribution circuitry 130. For implementations of system 100 that include visible light imaging sensor 108, sensor interface circuit 204 may be provided and adapted to interface with visible light imaging sensor 108.

Infrared image data received via sensor interface circuit 202 may represent one or more infrared images viewed by the infrared detectors (e.g., bolometers in a FPA) of infrared imaging sensor 104. If multiple such images are received consecutively with a specific time interval, infrared image data may correspond to infrared video frames that can be used to construct an infrared video. As would be understood by one in the art, each such image or frame may comprise a plurality of pixels, where a "pixel" refers to a data element containing a value or values characteristic of a specific geometric location of the image or frame. By way of example, a pixel may be a value indicative of thermal infrared intensity for location (a, b) of an infrared image or infrared video frame, where the image or frame may comprise for example 640-by-512 pixel locations (also referred to as image size or resolution). Since a pixel may be a value, it may be represented in digital formats using any desired number of bits (e.g., 16 bits to represent 65536 different intensity levels, or 14 bits, or 8 bits, etc.).

Thus, the infrared image data received via sensor interface circuit 202 may comprise a plurality of pixels, each of which may be a data element including a value represented using a specific number of bits. Likewise, for embodiments that include visible light imaging sensor 108 and corresponding sensor interface circuit 204, visible light image data comprising a plurality of pixels may be received. In some embodiments, sensor interface circuits 202 and/or 204 may include a volatile memory (also referred to herein as buffer memory) such as a RAM to buffer (e.g., temporarily store) pixels for one or more lines of an image/video frame, pixels for one or more video frames, or pixels in other granularities, before such pixels are processed by various components of main electronics block 102 as further described herein. In another context, a "pixel" may also refer to each infrared detector in infrared imaging sensor 104 or each visible light detector cell in visible light imaging sensor 108.

The infrared image data received via sensor interface circuit 202 may, however, contain distortions, noise, pixels that correspond to non-functioning detectors (also referred to as "bad pixels"), or other pixel non-uniformities attributable to infrared imaging sensor 104, optics block 106, or other components. As discussed above, in some implementations, some corrections may be performed by infrared imaging sensor 104 and/or bias generation and distribution circuitry 130 to generate infrared image data. Still, there may be some residual distortions and/or non-uniformities in the infrared image data received from infrared imaging sensor 104. In this sense, the infrared image data received from infrared imaging sensor 104 may still be referred as "raw" infrared image data, regardless of whether some corrections were performed by infrared imaging sensor 104 and/or bias generation and distribution circuitry 130.

According to various embodiments, main electronics block 102 may include various components and circuits configured to process the raw infrared image data received via sensor interface circuit 202, so as to compensate for various distortions and/or non-uniformities or otherwise provide more usable images and/or videos from the raw infrared image data. For some embodiments that include visible light imaging sensor 108, raw visible light image data may be processed for similar purposes. In this regard, pixels in the raw infrared image data and/or the raw visible light image data may undergo various processing operations performed on them by one or more components of main electronics block 102 to produce processed images or videos that may eventually be output to, for example, display screen 116, non-volatile memory 112 such as a flash ROM, and/or other external devices via PAN module 120, wireless communication module 122, wired communication module 124, USB connector module 126, and/or other peripherals. For convenience, such pixel processing operations may collectively be referred herein as a video chain, video processing chain/pipeline, video output chain/pipeline, or pixel processing chain/pipeline.

For example, each pixel in the raw infrared image data may be corrected for non-uniformity by adding an offset term, multiplying a gain term, adding a flat field compensation (FFC) offset, and/or applying other non-uniformity correction terms. In some applications, offset and/or gain terms may include those that are temperature dependent and obtained by performing temperature compensation calculations (e.g., curve-fitting operations using LaGrange coefficients). Non-uniformity corrections (NUCs) via application of offset and gain correction terms are further described in, for example, U.S. Pat. No. 6,812,465 previously referenced herein. Some non-uniformity correction terms may be pre-determined (e.g., when calibrations are performed in factory or during maintenance), while other non-uniformity terms may be determined and/or updated during operation of system 100. For example, scene-based NUC processes may be performed to determine scene-based NUC terms that may be applied in addition to or instead of pre-determined factory calibration terms. Examples of scene-based NUC processes may be found in U.S. Pat. No. 8,208,755 entitled "Scene Based Non-Uniformity Correction Systems and Methods" and issued to Hogasten, and in PCT Application No. PCT/US2012/41749 for "Non-Uniformity Correction Techniques for Infrared Imaging Devices" by Hogasten et al., which are incorporated by reference herein in their entireties.

Other pixel processing operations may also be performed to compensate for non-uniformities and/or distortions or otherwise provide more usable images or videos. Examples of such other pixel processing by main electronics block 102 include, but not limited to, "bad pixel" replacement operations, optical distortion corrections (e.g., including scaling, dewarping, and/or rotation to compensate for distortion effects caused by optics block 106 and/or other sources), and automatic gain control (AGC).

Typically, many of these and other pixel processing operations of a video chain involve repetitions of a same independent pixel-level operation for multiple pixels. For example, applications of NUC gain terms involve repeatedly performing for every pixel a multiplication operation with a corresponding gain term. Similarly, for example, applications of NUC offset terms involve repeating for every pixel (e.g., pixels in raw image data or pixels after they are corrected for gain) an addition operation with a corresponding offset term. Such repeating pixel-level operations can in theory be carried out in parallel, and as such, have a high potential for data-level (e.g., pixel-level) parallelism. However, conventional camera electronics and methods typically do not and cannot exploit available pixel-level parallelism in these and other pixel processing operations of a video chain.

As discussed above, various components may be provided and configured in main electronics block 102 to implement efficient, scalable, flexible, yet cost-effective electronics architectures that can beneficially exploit pixel-level parallelism available in various pixel processing operations. In one aspect, main electronics block 102 includes at least one vector processor 206(1) adapted to execute vector instructions to operate on multiple data elements in parallel. In general, vector instructions for vector processor 206(1) specify a same operation to be repeated independently for multiple data elements. In other words, a vector instruction for vector processor 206(1) specifies an operation on an entire vector (e.g., a collection of multiple data elements) rather than on a single data element. Thus, operations performed by execution of vector instructions are often referred to as "vector operations," whereas operations on a single data element are referred to as "scalar operations." Also, by comparison, processors that are adapted primarily for scalar operations are referred to as scalar processors.

In general, vector processor 206(1) includes a plurality of vector registers (also collectively referred to as a vector register file) each adapted to hold a vector to be operated on or a vector produced as a result of a vector operation, as further described later with reference to FIG. 3. Vector processor 206(1) also comprises one or more vector functional units, which may include a vector arithmetic-logic unit (ALU), a vector floating point unit (FPU), and/or other suitable vector functional unit adapted to operate on one or more vectors received from the vector registers providing operands (also referred to as "source" vector registers) and/or to store results in one of the vector registers (also referred to as a "destination" vector register).

The vector functional unit may be adapted to execute vector operations. That is, for example, the vector functional unit may execute a same operation independently repeated for all data elements held in a source vector register. In some embodiments, the vector functional unit may be adapted to execute a same operation for all data elements in a vector register at once in parallel. In other words, the vector functional unit in these embodiments may provide a plurality of "lanes" each corresponding to each data element in the vector register as would be understood by one in the art. In other embodiments, the number of lanes provided by the vector functional unit may be less than the number of data elements in the vector register. In such embodiments, the vector functional unit may still perform a same operation repeated for all data elements in a vector register as specified by a vector instruction, but not all data elements may be operated on at once in parallel. In yet other embodiments, the number of lanes and/or the number of data elements in a vector may be variably provided by vector processor 206(1).

In various embodiments, vector processor 206(1) may be utilized to perform one or more pixel processing operations in a video chain (e.g., including offset and gain correction operations, bad pixel replacement operations, AGC operations, distortion correction operations, and other operations). For example, each pixel processing operation may be coded, translated, or otherwise turned into one or more vector instructions that specify vector operations on multiple pixels (e.g., in the raw image data or partially processed image data), so that vector processor 206(1) may operate on multiple pixels at a time to perform pixel processing. Accordingly, various embodiments of system 100 having vector processor 206(1) may efficiently exploit pixel-level parallelism available in the pixel processing operations.

According to some embodiments, main electronics block 102 may comprise a plurality of such vector processors 206(1)-206(n) each adapted to independently execute vector instructions on multiple pixels at a time. In one specific implementation example, main electronics block 102 may comprise at least twelve of such vector processor 206(1)-206(12). Such multi-vector processor architecture embodiments may enable scalable and flexible image processing electronics that may be capable of handling demanding video/image processing and analytics. As an example, FIG. 2 shows a video chain (e.g., including offset and gain correction operations, bad pixel replacement operations, AGC operations, distortion correction operations, and other operations) that is distributed and pipelined over two vector processors 206(1) and 206(2), thereby utilizing two vector processors independently to provide a higher throughput.

Thus, for example, multi-vector processor architecture embodiments may enable imaging device electronics that can scale well with an increase in image/video resolution and/or an increase in frame rate. As may be appreciated, advances in imaging sensor technology or other changes in system 100 may permit higher pixel count and/or more frames per second to be captured, which in turn may result in a corresponding increase in the demand for pixel processing power. For example, an increase in a thermal imaging sensor resolution from 640 by 512 pixels to 1280 by 1024 pixels may result in a four-fold increase in the number of pixels to be processed by a video chain.

In multi-vector processor architecture embodiments of main electronics block 102, such an increase in the number of pixels to be processed can be accommodated by assigning more vector processors as needed to provide a desired throughput. More specifically in some implementation examples, a video chain may be spread horizontally over multiple vector processors in effect to operate on a wider vector of pixels. That is, multiple vector processors may each be assigned a portion of image data on which to perform pixel processing operation (e.g., each assigned its own sets of pixels to operate on). For example, if assuming that one vector processor capable of operating on a vector of eight pixels at a time provided sufficient throughput for a baseline case, a four-fold increase in pixel count may be accommodated by four such vector processors collectively and effectively operating on a vector of thirty two pixels at a time. In other implementation examples, a video chain may be spread vertically. In other words, operations in a video chain may is suitably be partitioned and distributed over multiple pipeline stages, where multiple vector processors may each be assigned a pipeline stage. For example, as shown in FIG. 2 and discussed above, a video chain may be pipelined over two vector processors 206(1) and 206(2), which may potentially provide twice the throughput compared with one vector processor 206(1) or 206(2) carrying out the video chain. Combinations of horizontal and vertical spreading are also possible and may be utilized depending on desired applications (e.g., pixel processing operations desired for a video chain) and/or available resources (e.g., available memory bandwidth). For example, eight vector processors may be configured in two pipeline stages, with four vector processors assigned to perform operations in the first pipeline stage and the other four assigned to the second pipeline stage.

Scalability and flexibility provided in multi-vector processor architecture embodiments may permit a video chain for system 100 to be expanded to include additional pixel processing operations further to non-uniformity and/or distortion compensation operations or other basic video chain operation examples discussed above. Such additional pixel processing operations may be performed to produce enhanced or otherwise more usable images/videos according to the desired enhancement/correction and available vector processing power. For example, an expanded video chain may additionally perform image blending (e.g., blending infrared image data with visible light image data to enhance contrast, resolution, and/or color), resolution enhancement (also referred to herein as "super resolution"), video/image transcoding (e.g., compression, encoding, and/or other coding operations) and/or other advanced video/image processing. Examples of image blending are described in U.S. patent application Ser. No. 12/766,739 filed Apr. 23, 2011 and entitled "Infrared Resolution and Contrast Enhancement with Fusion," and in U.S. patent application Ser. No. 13/105,765 filed May 11, 2011 and entitled "High Contrast Fusion," which are all incorporated herein by reference in their entireties.

In the example shown in FIG. 2, additional image blending, resolution enhancement, and video compression pipeline stages are respectively assigned to and performed by vector processors 206(3), 206(5), and 206(n), such that an expanded video processing chain may be distributed and coordinated over vector processors 206(1), 206(2), 206(3), 206(5), and 206(n). Thus, multiple vector processors 206(1)-206(n) according to some embodiments may permit flexible expansions of a video processing chain to include optional image enhancement and/or correction operations as desired for particular applications of system 100 and/or depending on available vector processing power or other factors (e.g., battery life).

Vector processors 206(1)-206(n) in multi-vector processor architecture embodiments of main electronics block 102 may also be utilized to perform other operations that are not typically part of a video chain to produce images/videos from the raw image data. For example, an implementation of system 100 as an infrared camera or other types of surveillance camera may be configured to perform various types of video analytics such as object detection, object counting, virtual tripwire detection (e.g., detecting whether an object enters an area of interest), posture detection (e.g., detecting whether a person has fallen down and may need assistance), thermal image analysis (e.g., hot/cold spot detection, temperature distribution analysis, or other analysis of images based on thermal information therein), and others. These and other types of video analytics may in part involve various pixel-level operations such as image filtering operations, statistical modeling (e.g., pixel counting and/or pixel grouping) operations, or others.

In some embodiments, one or more of vector processors 206(1)-206(n) may be configured to perform vector processing of such pixel-level operations associated with various video/image analytics, in parallel with other vector processors performing various pixel processing operations for a video chain or other desired processing. FIG. 2 shows, as an example, vector processor 206(4) configured to perform pixel-level functions for video analytics. Another example of operations that one or more of vector processors 206(1)-206(n) may be configured to perform include operations for a graphical user interface ("GUI"), such as generating legends, scales, reticles, menus, icons, or other graphical features that facilitate interactions with a user of system 100. In the example of FIG. 2, vector processor 206(5) may be configured to perform operations for GUI functionalities, in parallel with other vector processors performing various pixel processing operations for a video chain or other desired processing. Other examples of operations that one or more of vector processors 206(1)-206(n) may be configured to perform may include LaGrange curve-fitting operations to obtain temperature-dependent offset and/or gain correction terms and operations to obtain SBNUC terms.

Therefore, in various embodiments, main electronics block 102 may include one or more vector processors 206(1)-206(n) that may be configured to provide the processing power and flexibility to handle pixel processing and other functionalities demanded in imaging devices and systems such as infrared cameras. For example, at one level, one or more vector processors 206(1)-206(n) may each execute vector operations on multiple pixels or other types of data elements to exploit data-level (e.g., pixel-level) parallelism for high throughput processing of various operations in a video chain, video analytics, and/or other desired functionalities. At another level, in multi-vector processor embodiments, various types of operations such as for a video chain, video analytics, GUI, and/or other functionalities desired for an imaging system may be distributed among a plurality of vector processors 206(1)-206(n) and executed in parallel to exploit yet another level of parallelism (e.g., thread-level parallelism). At yet another level, a plurality of vector processors 206(1)-206(n) may be configured for horizontal and/or vertical extension of a video chain pipeline to accommodate an increase in pixel count or frame rate and/or a demand for enhanced, more advanced pixel processing.

By comparison, in conventional electronics architectures for imaging systems (e.g., infrared cameras), pixel processing is generally performed by a scalar processor (e.g., including various types of digital signal processors (DSPs)), a programmable logic device (PLD) such as a field programmable gate array (FPGA), or hardwired electronics. Scalar processors in conventional imaging device electronics typically execute instructions that work on one pixel at a time, or at most a few pixels even with SIMD extensions, and as such cannot efficiently achieve high throughput pixel processing as does one or more vector processors 206(1)-206(n). PLDs such as FPGAs configured for pixel processing in conventional imaging electronics are inherently limited to running at a slower clock rate, and thus cannot achieve high throughput pixel processing, either. For example, an FPGA configured for pixel processing in infrared camera electronics may be capable of running at 150 MHz, although 75 MHz is typical, whereas vector processors 206(1)-206(n) may be capable of running at 800 MHz to 1.2 GHz or more in one non-limiting implementation example. Hardwired electronics implementations perform pixel processing by custom fixed circuitry and thus may be capable of high throughput pixel processing. However, hardwired electronics are more costly to implement, and more importantly do not offer the programmability or the configurability of vector processors 206(1)-206(n) that provides the flexibility to accommodate various desired applications of imaging devices and systems.

Turning now to another aspect of main electronics block 102, main electronics block 102 may include one or more local memories 208(1)-208(n) communicatively coupled to and accessible by one or more vector processors 206(1)-206(n) according to various embodiments of the disclosure. In some embodiments, local memories 208(1)-208(n) may each be associated with one of vector processors 206(1)-206(n). Such configurations may be herein referred to as assigned local memory configurations. In assigned local memory configurations, each of vector processors 206(1)-206(n) may directly access its assigned local memory/memories. For example, as shown in FIG. 2, local memories 208(1)-208(n) may each be communicatively coupled to a corresponding one of vector processors 206(1)-206(n) via a corresponding one of local buses 210(1)-210(n). In another example of assigned local memory configuration, two or more local memories (e.g., in parallel, hierarchical, or other arrangements) may be assigned to and accessed by one of vector processors 206(1)-206(n). In other embodiments, local memories may be shared by two or more of vector processors 206(1)-206(n). Such configurations may be herein referred to as shared local memory configurations. Shared local memory configurations may be N-to-1 (i.e., N multiple vector processors may share one local memory) or N-to-M (i.e., N multiple vector processors may access any of M local memories). It is also contemplated that shared local memories may be logically partitioned, with each logical partition assigned to one or more of vector processors 206(1)-206(n). Combinations of assigned, shared, and/or partitioned local memory configurations are also possible depending on desired applications of main electronics block 102.

As one example in FIG. 2 shows, local memories 208(1)-208(n) may be implemented with a static random access memory (SRAM) to provide a faster memory access time than a typical DRAM. Implementations of local memories 208(1)-208(n) using other types of memory such as a DRAM are also contemplated for other embodiments. Local memories (e.g., local memories 208(1)-208(n)) may be multi-ported to allow simultaneous or substantially simultaneous access to data stored on the local memories, or may be single-ported. In general, embodiments having shared local memory configurations may utilize multi-ported memories to provide higher memory bandwidth for access by multiple vector processors, but utilizing multi-ported memories is not a requirement that limits such embodiments. In some embodiments, local memories (e.g., local memories 208(1)-208(n)) may provide addressable memory space (e.g., may be accessible by memory addresses), whereas in other embodiments all or some of the local memories may implement cache memories (e.g., having appropriate caching logic) for vector processors 206(1)-206(n). By virtue of their proximity, close coupling, and in some cases the type of RAM used (e.g., SRAM), local memories (e.g., local memories 208(1)-208(n)) may provide high bandwidth, low latency memory access to the associated one(s) of vector processors 206(1)-206(n).

Local buses 210(1)-210(n) may be implemented with any appropriate interconnect that communicatively couples local memories 208(1)-208(n) to appropriate one(s) of vector processors 206(1)-206(n). For example, local buses 210(1)-210(n) may be serial buses, parallel buses, crossbars, or other appropriate interconnect configured to pass control (e.g., addressing) signals to local memories 208(1)-208(n) and pass data to and from local memories 208(1)-208(n). In some embodiments, local buses may be combined with one another and/or augmented with switching circuitry to provide a desired memory bandwidth and/or latency. For example, for some embodiments a switching interconnect (e.g., a crossbar switch) may be provided in addition to or in place of simple buses to facilitate 1-to-M, N-to-1, or N-to-M vector processor-local memory configurations.

In one or more embodiments, the one or more local memories (e.g., local memories 208(1)-208(n)) may be adapted to store data to be consumed by associated one(s) of vector processors 206(1)-206(n). As further described herein for example with respect to FIG. 3, various components of main electronics block 102 may be configured to transfer (e.g., forward or pre-fetch) data to be consumed by vector processors 206(1)-206(n) to their associated local memories, so that vector processors 206(1)-206(n) may access data that they need from their associated local memories. In one or more embodiments, for example, data to be consumed may be transferred from other local memories, global memory 110, non-volatile memory 112, the buffer memory of sensor interface 202 or 204, and/or other storage to appropriate one(s) of local memories prior to or as need for consumption of such data by associated one(s) of vector processors 206(1)-206(n). In this regard, for example, a selected group of pixels may be pre-transferred to and ready in appropriate one(s) of local memories for accessing and processing by associated one(s) of vector processors 206(1)-206(n). The selected group of pixels may be, for example, pixels in one or more lines of video/image, pixels in one or more memory lines or blocks, or pixels in other suitable groupings. Other data to be transferred to and stored in the local memories include, for example, calibration terms, bad pixel maps, pixel deltas and weights for distortion correction, color look up tables (LUTs), and/or intensity transform tables (ITTs).

Such other data may be transferred to and stored in the local memories in its entirety or in portions as needed by associated one(s) of vector processors 206(1)-206(n).

In some cases, the local memories may also store data that is produced by vector processors 206(1)-206(n). For example, data produced by vector processors 206(1)-206(n) may include partially processed pixels (e.g., pixels at an intermediate pipeline stage of a video chain), fully processed pixels (e.g., representing pixels in output videos/images), results of pixel-level functions of video analytics (e.g., filtered pixels, statistical data, or other data depending on the pixel-level function), and other data depending on the operations that vector processors 206(1)-206(n) are configured to perform. Such produced data stored in the local memories may then be transferred to global memory 110, other local memories, and/or other storage for further processing or producing an output.

Thus, in one or more embodiments, vector processors 206(1)-206(n) may access data from and store data in their associated local memories which, as described above, may provide relatively (e.g., relative to global memory 110 or unassociated ones of the local memories) higher throughput and lower latency access by virtue of their proximity, close coupling, and/or memory type. Accordingly, in embodiments where main electronics block 102 is configured to provide such local data access and storage for vector processors 206(1)-206(n), even faster and more efficient processing by vector processors 206(1)-206(n) may be achieved.

In another aspect, main electronics block 102 according to various embodiments may include a general-purpose processor 212. General-purpose processor 212 may be implemented with any appropriate processing device, such as a reduced instruction set computing (RISC) processor, complex instruction set computing (CISC) processor, DSP, programmable microcontroller, or other suitable programmable processing device. Multicore implementations of such devices are also contemplated for general-purpose processor 212. In the example of FIG. 2, a RISC CPU is shown for general-purpose processor 212. In general, RISC processors, CISC processors, DSPs, or microcontrollers that may be used to implement general-purpose processor 212 are scalar processors in contrast to vector processors 206(1)-206(n) described above, although some SIMD processing capabilities (e.g., through SIMD extension instructions) and/or superscalar processing capabilities (e.g., by performing out-of-order execution and utilizing multiple functional units to exploit instruction-level parallelism) may be provided. Other implementations of general-purpose processor 212, for example ASIC or PLD implementations, may be used for some embodiments.

In various embodiments, general-purpose processor 212 may be configured to perform operations to support the overall operation of system 100. For example, general-purpose processor 212 may be configured to support overall system configuration, vector processing configuration, data and memory management, higher-level processing portions (e.g., serial code sections or non-vectorizable sections) of video analytics and other functions of system 100, user interface functions (e.g., processing user inputs received from user input component 128 and/or generating appropriate responses to such inputs), operating system functions (e.g., real-time operating system (RTOS) functions including the real-time scheduler, file system, network protocol stacks, peripheral drivers, and/or other functions), and/or other operations for system 100 according to various embodiments of the disclosure.

Examples of the system configuration operations that general-purpose processor 212 may be configured to handle may include setting various operating parameters of system 100 (e.g., based on a user's input via user input component 128, or other conditions or information), power management, system initialization (e.g., after power-on), system testing and calibration support, and/or other desired operations to support system configuration and management. Examples of the vector processing configuration operations may include assigning and distributing various vector processing tasks to vector processors 206(1)-206(n) to set up various vector processing configurations discussed above with respect to vector processors 206(1)-206(n). That is, for example, in one or more embodiments, general-purpose processor 212 may be configured to enable, disable, or otherwise control vector processors 206(1)-206(n) (e.g., by setting appropriate control bits or sending appropriate commands), and/or to provide appropriate instructions to vector processors 206(1)-206(n) to set up vector processing configurations according to a user's input (e.g., to turn on or off certain pixel processing operations), application requirements (e.g., desired throughput or frame rates), power consumption (e.g., to turn off one or more of vector processors 206(1)-206(n) while not being used to save power), and/or other factors.

The data and memory management (also referred to herein as buffer management) that general-purpose processor 212 may be configured to perform includes, for example, the various operations for transferring pixels and other data to the local memories (e.g., local memories 208(1)-208(n)) as needed for and/or prior to processing by associated one(s) of vector processors 206(1)-206(n), as described above with respect to the local memories. In some embodiments, general-purpose processor 212 may be configured to set up direct memory access (DMA) transfers at appropriate times from sensor interface 202/204 (e.g., from the buffer memory), global memory 110, non-volatile memory 112, or other storage to the local memories, or between the local memories, so that pixels and other data to be used by vector processors 206(1)-206(n) may be accessed from the associated local memories. In some embodiments, general-purpose processor 212 may also be configured to set up DMA transfers from the local memories to global memory 110, non-volatile memory 112, or other peripheral devices (e.g., to a peripheral interface block 218), for example, to transfer processed or partially processed pixels and other data to appropriate components for further processing or output.

In this regard, in some embodiments, main electronics block 102 may include one or more DMA engines 214 configured to receive commands from general-purpose processor 212 to perform the DMA transfers. All or some of DMA engines 214 may be implemented as separate components of main electronics block 212 as shown in FIG. 2, or may be integrated with or implemented as part of sensor interface 202/204, a global memory controller 216, a peripheral interface block 218, or other components of main electronics block 102. In some embodiments, at least some DMA engines 214 may be configured to receive DMA transfer commands additionally or instead from components of main electronics block 102 other than general-purpose processor 212.

In various embodiments, main electronics block 102 may include global memory controller 216 having logic circuitry to facilitate reading and writing of data to and from global memory 216 (e.g., one or more banks of DRAM), for example, by generating appropriate timing, control, and/or refresh signals. In various embodiments, main electronics block 102 may also include peripheral interface block 218 having various logic circuits and components configured to control and interface with various peripheral devices such as non-volatile memory 112, display screen 116, GPS module 118, wired communication module 124, USB connector module 126, and/or other peripherals (e.g., including PAN module 120, wireless communication module 122, user input component 128, and/or other devices or components external to main electronics block 102). Thus, for example, peripheral interface block 218 may include appropriate circuits or components to implement a non-volatile memory interface (e.g., Flash ROM drive interface), a USB interface, Ethernet media access control (MAC) layer protocols, a mobile industry processor interface (MIPI) (e.g., to interfaces with other mobile devices to provide camera and other functions), a display interface, an inter-integrated circuit (I2C) interface (e.g., SMBus interface) for communications with other components via an I2C-compliant bus, a serial peripheral interface (SPI) for communications with other components via a SPI-compliant bus, and/or other standard or proprietary interfaces and protocols.

In some embodiments, main electronics block 102 may include a hardwired processing block 220 having fixed (e.g., non-programmable or with limited configurability) circuitry to complement operations of vector processors 206(1)-206(n) and/or general-purpose processor 212. In some embodiments, hardwired processing block 220 may additionally or instead be implemented with a PLD such as an FPGA. In some embodiments, a corresponding local memory 222 may be provided and accessed by hardwired processing block 220 via local bus 224.

In various embodiments, main electronics block 102 may include a main bus 226 configured to interconnect various components of main electronics block 102. Main bus 226 may be implemented using any suitable bus architecture to provide a desired bandwidth for communication among various components of main electronics block 102. For example, main bus 226 may be a serial bus or a parallel bus, having one or more lanes, hierarchically structured or flat, and may include a bus controller, a switch interconnect (e.g., a crossbar switch) and/or other logic or not depending on application requirements.

For some embodiments, various components of main electronics block 102 described above may be integrated into a single system-on-a-chip (SOC). Thus, for such embodiments, main electronics block 102 may represent a SOC that integrates sensor interface circuit 202, sensor interface circuit 204, vector processors 206(1)-206(n), local memories 208(1)-208(n), local buses 210(1)-210(n), general-purpose processor 212, one or more DMA engines 214, global memory controller 216, peripheral interface block 218, hardwired processing block 220, local memory 222, local bus 224, and/or main bus 226. Depending on desired applications or implementations, one or more components of main electronics block 102 may be removed from the SOC implementing main electronics block 102, and/or one or more other components of system 100 may be integrated into the SOC. For example, in some embodiments, sensor interface circuits 202, 204, and/or global memory controller 216 may be implemented as discrete components that are separate from the SOC implementing main electronics block 102. In another example, GPS module 118, PAN module 120, wireless communication module 122, and/or wired communication module 124 may be integrated into the SOC implementing main electronics block 102.

SOC implementations of main electronics block 102 according to various embodiments of the present disclosure may beneficially increase reliability, reduce cost, and permit a smaller package by reducing the number of discrete components needed to implement system 100. In this regard, implementing main electronics block 102 as a SOC in accordance with various embodiments of the disclosure may yield a single inexpensive component that provides vector processing power to deliver desired functionalities and throughput for various applications of system 100.

Figure 3:
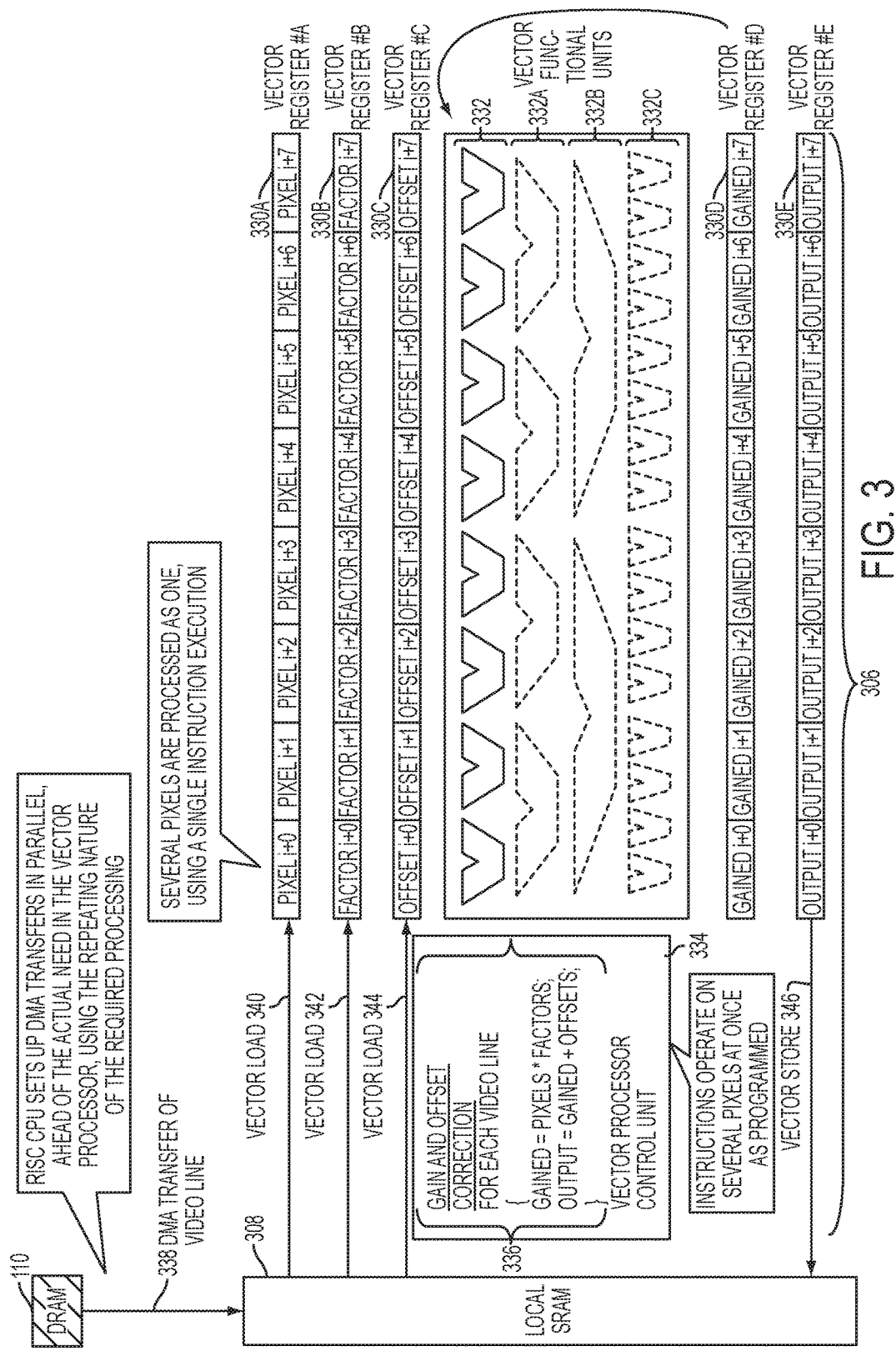
FIG. 3 illustrates a block diagram of example pixel processing by a vector processor of the system of FIGS. 1 and 2, in accordance with an embodiment of the disclosure.

Turning now to FIG. 3, a block diagram is illustrated of an example of pixel processing by a vector processor 306 in accordance with an embodiment of the disclosure. In particular, FIG. 3 shows vector processor 306 operating on multiple pixels at once using vector operations to perform offset and gain correction operations of a video chain, in accordance with an embodiment of the disclosure. Vector processor 306 may represent any one of vector processors 206(1)-206(n) described above.

As described with reference to vector processors 206(1)-206(n), vector processor 306 may include a plurality of vector registers, five of which (e.g., vector registers 330A-330E) are shown in FIG. 3. The vector registers may be provided in any number desired for particular applications, with typical implementations generally having anywhere between 8 to 256 vector registers. The vector registers (e.g., including vector registers 330A-330E) may each be adapted to hold (e.g., temporarily store) a vector to be operated on or a vector produced as a result of a vector operation. Vector registers 330A-330E shown in the example of FIG. 3 each hold a vector having eight data elements (i.e., having a vector length of eight). In general, the vector length may be chosen based on various factors, for example depending on the number of bits per data element (e.g., the word width), implementations of vector functional units, and/or other factors. In one specific implementation example, the vector registers (e.g., including vector registers 330A-330E) may each be 128 bit-wide and adapted to hold eight 16-bit data elements, which may be well-suited for vector processing of pixels represented in a 16-bit digital format. In some embodiments, the vector length and data element width of the vector registers may be variably provided. For example, in one specific implementation, each vector register may be 128-bit wide, and selectable to hold sixteen 8-bit data elements (16×8-bit configuration), eight 16-bit elements (8×16-bit configuration), four 32-bit elements (4×32-bit configuration), or two 64-bit elements (2×64-bit configuration) depending on appropriate data element widths desired for particular applications.

As also described above with reference to vector processors 206(1)-206(n), vector processor 306 may include one or more vector functional units 332, which may include one or more vector arithmetic-logic units (ALUs), one or more vector floating point units (FPUs), and/or one or more other suitable vector functional units adapted to operate on one or more vectors received from source vector registers and/or to store results in a destination vector register. In some embodiments, vector functional units 332 may be pipelined with appropriate number of stages to achieve higher throughput.

As described earlier for vector processors 206(1)-206(n), vector functional units 332 may provide one or more lanes for processing data elements. In some embodiments, the number of lanes provided by vector functional units 332 may correspond to the vector length of the vector registers. For example, vector registers 330A-330E may have a vector length of eight and vector function units 332 may provide eight lanes corresponding to the vector length, such that eight data elements per source vector registers may be operated on at once in parallel, as shown in the example of FIG. 3. In some embodiments, the number of lanes for vector functional units 332 may be selectably provided. In such embodiments, vector functional units 332 may be selectably reconfigured to support the vector length and data element width of the vector registers, which may also be selectable as discussed above. For example, vector functional units 332 may be selectably reconfigured for four lanes (as shown in alternate configuration 332A of vector functional units 332) corresponding to a 4×32-bit vector register configuration, for two lanes (as shown in alternate configuration 332B) corresponding to a 2×64-bit vector register configuration, or for sixteen lanes (as shown in alternate configuration 332C) corresponding to a 16×8-bit vector register configuration.

Vector processor 306 may include a vector processor control unit 334, which may include vector instruction fetch and decode logic adapted to control various aspects of vector processor 306 to execute vector operations using vector functional units 332 according to vector instructions 336. While FIG. 3 symbolically shows vector instructions 336 in a high-level language description, vector instructions 336 may be machine instructions as would be understood by one skilled in the art, and may be stored in and fetched from appropriate components, such as for example in an instruction cache of vector processor 306, a local memory 308, global memory 110, and/or other suitable memories/storage. In the example shown in FIG. 3, vector instructions 336 may configure vector processor 306 to perform offset and gain correction operations of a video chain using vector processing capabilities of vector processor 306 described above.

Pixel processing by vector processor 306 will now be described in accordance with various embodiments of the disclosure, with offset and gain correction operations of a video chain as a non-limiting example. As described above with reference to local memories 208(1)-208(n), pixels to be processed by vector processor 306 may be transferred (e.g., forwarded or pre-fetched) to local memory 308 (which may represent any one of local memories 208(1)-208(n)) associated with vector processor 306, so that a selected group of pixels may be pre-transferred to and ready in local memory 308 for accessing and processing by vector processors 306. In the example shown in FIG. 3, general-purpose processor 212, as part of data and memory management it may be configured to perform, may set up a DMA transfer 338 of one or more selected video lines of pixels from global memory 110 to local memory 308, ahead of performing gain and offset correction operations on pixels of the selected video lines by vector processor 306. Gain and offset correction terms may also be transferred to local memory 308 at appropriate times and ready for access by vector processor 306.

In other examples, DMA transfer 338 may additionally or alternatively be set up by vector processor 306, sensor interface circuit 202/204, and/or components of system 100 other than general-purpose processor 212, as discussed above with reference to DMA engines 214. In other examples, DMA transfer 338 may transfer pixels according to other suitable groupings, such as for example pixels in one or more memory lines or blocks, as discussed above with reference to local memories 208(1)-208(n). In other examples, DMA transfer 338 may be set up to transfer pixels from sensor interface circuit 202/204 (e.g., from the buffer memory), from non-volatile memory 112 (e.g., to transfer calibration terms), and/or between local memories 208(1)-208(n) (e.g., to transfer partially processed pixels between pipeline stages assigned to vector processors 206(1)-206(n)), as described above with reference to FIG. 2.

To perform gain and offset correction operations according to vector instructions 336, pixels stored in local memory 308 may be loaded onto one of the vector registers (e.g., vector register 330A) via a vector load operation 340. Corresponding gain correction terms (e.g., gain factors) and offset correction terms to be applied to the vector loaded pixels may also be loaded onto vector registers (e.g., vector registers 330B and 330C, respectively, in the example of FIG. 3) via vector load operations 342 and 344, respectively. Vector load operations 340, 342, and 344 may be carried out by one or more vector load/store units (not shown) included in vector processor 306 according to vector load instructions in vector instructions 336, as may be appreciated by one skilled in the art.

With vector registers 330A, 330B, and 330C loaded with pixels to operate on and corresponding correction terms, vector operations to correct gain and offset for the loaded pixels may be carried out by vector functional units 332 according to vector instructions 336. For example, eight pixels (labeled "pixel i+0" through "pixel i+7" for purposes of illustration) in vector register 330A may each be multiplied by a corresponding one of eight gain correction factors labeled "factor i+0" through "factor i+7" in vector register 330B at once in parallel by a vector multiply unit of vector functional units 332. The resulting gain corrected pixels may be saved in one of the vector registers (e.g., vector register 330D) as eight elements labeled "gained i+0" through "gained i+7." The gain corrected pixels "gained i+0" through "gained i+7" in vector register 330D may then be added a respective one of offset terms "offset i+0" through "offset i+7" at once in parallel by a vector addition unit of vector function units 332, with the resulting gain and offset corrected pixels saved as eight elements labeled "output i+0" through "output i+7" in vector register 330E. The resulting gain and offset corrected pixels may be stored in local memory 308 via a vector store operation 346 by the vector load/store unit. From local memory 308, the gain and offset corrected pixels may be transferred to another local memory associated with another vector processor for further pixel processing (e.g., performing next pipeline stage) or other components of system 100 (e.g., to generate a video/image output) as described above herein.

Although vector processing of pixel by vector processor 306 is described above with offset and gain correction operations as one example, one skilled in the art will appreciate that other operations of a video chain (e.g., bad pixel replacement operations, AGC operations, distortion correction operations, image blending operations, resolution enhancement operations, video compression, or other operations) or pixel-level operations of video analytics or GUI may also be performed by vector processor 306 in a manner consistent with the spirit and scope of the disclosure. Thus, by performing vector operations on multiple pixels in parallel as described for various embodiments with reference to FIG. 3, pixel-level parallelism may be efficiently exploited to deliver high throughput processing of various operations in a video chain, video analytics, GUI, and/or other desired functionalities for system 100. Further, as described above with reference to local memories 208(1)-208(n), local memory 308 may provide lower latency and/or higher throughput data access to its associated vector processor 306 for various embodiments. Thus, by providing efficient buffer management as illustrated above for various embodiments (e.g., by transferring pixels and other data to local memory 308 associated with vector processor 306 at appropriate times), high throughput processing by vector processor 306 may be further supported.

Figure 4:
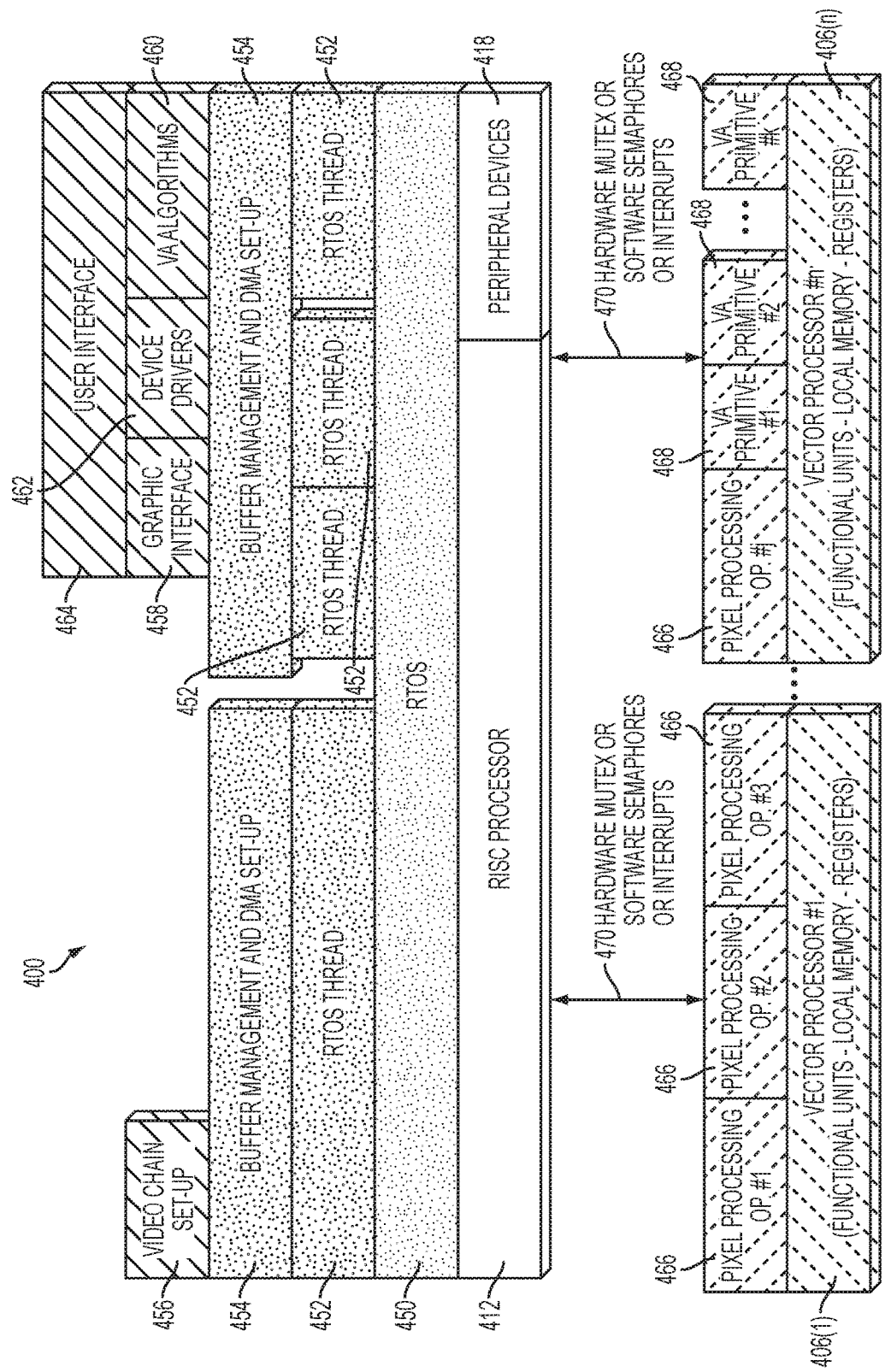
FIG. 4 illustrates a software layer diagram of an example software architecture for the system of FIGS. 1 and 2, in accordance with an embodiment of the disclosure.

FIG. 4 is a block diagram illustrating software layers 400 of an example software architecture for main electronics block 102, in accordance with an embodiment of the disclosure. Various system-level and application-level software components are shown layered in FIG. 4. Also shown in FIG. 4 are various hardware abstraction layers, which may represent a software view of various hardware components of main electronics block 102, and may or may not represent actual software routines and/or data that create abstractions of hardware components as desired for particular implementations.

Software layers 400 for main electronics block 102 may include a general-purpose processor hardware abstraction layer (HAL) 412 representing a software view of general-purpose processor 212 and a peripheral device HAL 418 representing a software view of peripheral interface block 218 and various devices that may be controlled and/or interfaced via peripheral interface block 218. On top of such HALs 412 and 418 may lie an operating system 450 interacting with general-purpose processor 212, peripheral interface block 218, and various peripheral devices, as represented by HALs 412 and 418. As may be appreciated by one skilled in the art, operating system 450 may manage various hardware resources (e.g., those represented by HALs 412 and 418) and provide common services for other system-level and application-level software to utilize the various hardware resources. For example, operating system 450 may provide scheduling and multitasking functionalities, file system handling, network stacks, virtual memory management, and/or other operating system functionalities.

In some embodiments, the scheduler that performs the scheduling functionalities of operating system 450 may be configured to support real-time applications by scheduling tasks (e.g., including jobs, processes, threads, and/or other units of execution) to substantially or deterministically meet a real-time demand (e.g., also referred to as hard real-time scheduling) or generally meet a real-time demand (e.g., also referred to as soft real-time scheduling). Operating system 450 in such embodiments may be referred to as real-time operating system 450 (RTOS) as indicated for an embodiment in FIG. 4. Also in such embodiments, other components such as an interrupt handler and/or memory allocator of operating system 450 may be further adapted to support real-time scheduling.

Operating system 450 may support creation, scheduling, and/or other management of threads 452, for example, through the scheduler and/or other operating system kernel functionalities. In various embodiments, operating system 450 may manage multiple threads 452 at a time to provide multithreading capabilities as would be understood by one skilled in the art. In embodiments where operating system 450 may be a RTOS, at least some of threads 452 can be assigned a real-time priority, and may be scheduled and/or otherwise managed to meet hard or soft real-time demands by application-level and/or system-level software routines. Such threads may be referred to as RTOS or real-time threads as shown for one example in FIG. 4.

In various embodiments, software layers 400 for main electronics block 102 may include buffer management routines 454 configured to set up and/or otherwise manage transfers (e.g., including DMA transfers) of pixels and other data to/from local memories 208(1)-208(n), global memory 110, non-volatile memory 112, sensor interface 202/204 buffer memories, and/or other storage at appropriate times as detailed herein above with reference to local memories 208(1)-208(n), general-purpose processor 212, and FIG. 3. In some embodiments, buffer management routines 454 may be configured to run as higher priority threads (e.g., real-time threads) relative to other software routines. In one example shown in FIG. 4, buffer management routines 454 may run as multiple real-time threads so that, for example, pixels and other data to be accessed by vector processors 206(1)-206(n) may be transferred to and ready for access in appropriate ones of local memories 208(1)-208(n) deterministically, substantially, or generally within a predetermined scheduled time.

At higher layers, other software components may also be provided which may interact with other components of software layers 400 and execute on general-purpose processor 212. In various embodiments, such other software components may include a vector processing configuration routine 456 adapted to cause general-purpose processor to assign and distribute various vector processing tasks to vector processors 206(1)-206(n) to set up various vector processing configurations discussed above with respect to vector processors 206(1)-206(n). For example, vector processing configuration routine 456 may be adapted to interact with other software and/or hardware components to set up various pixel-level operations of video analytics and various operations of a video chain for vector processors 206(1)-206(1) as described above with reference to vector processors 206(1)-206(n) and general-purpose processor 212. As such, vector processing configuration routine 456 in one example may also be referred to as a video chain set-up routine. In general, vector processing configuration routine 456 may execute, for example, when system 100 is powered up (e.g., booted), when various conditions (e.g., power consumption, battery life, and/or other conditions of system 100) change, and/or in response to a user's input (e.g., to turn on or off certain pixel processing operations). Accordingly in some embodiments, vector processing configuration routine 456 may be assigned one or more non-RTOS threads.

Software components at higher layers may also include a GUI component 458, a video analytics component 460, and/or device drivers 462. GUI component 458 may contain software routines to generate legends, scales, reticles, menus, icons, or other graphical features that facilitate interactions with a user of system 100. Although in general high-level routines (e.g., serial code sections or non-vectorizable sections) of GUI component 458 may execute on general-purpose processor 212, pixel-level operations of GUI component 458 may be assigned to and performed by one or more of vector processors 206(1)-206(n) as described above, according to various embodiments. Video analytics component 460 may contain various routines for various types of video analytics such as object detection, object counting, virtual tripwire detection, thermal image analysis, and/or others. Although in general high-level functions of video analytics component 460 may execute on general-purpose processor 212, pixel-level operations of video analytics component 460 may be assigned to and performed by one or more of vector processors 206(1)-206(n) as described above, according to various embodiments. Device drivers 462 may contain various routines to control and interface with various peripheral devices via peripheral interface block 218, as would be understood by one skilled in the art. In various embodiments, software layers 400 may further include a user interface component 464 containing software routines to interact with GUI component 458, video analytics component 460, and/or device drivers 462 to process user inputs and/or generate appropriate responses to such inputs.

In various embodiments, software layers 400 for main electronics block 102 may also include vector processor HALs 406(1)-406(*n*) representing a software view of vector processors 206(1)-206(*n*), which in turn may represent various devices (e.g., vector functional units 332), memories (e.g., local memory 308), and/or registers (e.g., vector registers 330A-330E) associated with each vector processor 206(1)-206(*n*). As discussed above and would be appreciated by one skilled in the art, HALs (e.g., including vector processor HALs 406(1)-406(*n*)) provided in FIG. 4 do not necessarily correspond to actual software routines, data, and/or other software implementations. That is, for some embodiments, vector processor HALs 406(1)-406(*n*) may simply be representations of vector processors 206(1)-206(*n*) for purposes of illustrating overall software layer architectures, while for other embodiments vector processor HALs 406(1)-406(*n*) may contain actual software routines, data, and/or other software implementations to create abstractions of vector processors 206(1)-206(*n*) for other software components.

In various embodiments, one or more pixel processing routines 466 may be provided for execution by vector processors 206(1)-206(*n*) (represented as vector processor HALs 406(1)-406(*n*) in FIG. 4). Pixel processing routines 446 may include software routines for offset and gain correction, bad pixel replacement, AGC, distortion correction, image blending, resolution enhancement, video/image transcoding all described above in connection with vector processors 206(1)-206(*n*), and/or other operations for processing pixels. Each pixel processing routine 466 may correspond to each of these operations, a combination of these operations, or a portion of these operations. In various embodiments, one or more video analytics primitives 468 (e.g., pixel-level operations) and/or GUI primitives (not shown in FIG. 4) may also be provided for execution by vector processors 206(1)-206(*n*), as discussed above in connection with vector processors 206(1)-206(*n*).

In some embodiments, various other non-image processing primitives may also be allocated to one or more of vector processors 206(1)-206(*n*) to further exploit data-level and thread-level parallelism. For example, various parallelizable operations to process data to/from GPS module 118, PAN module 120, networking modules 122 and/or 124 may be assigned to (e.g., by operating system 450 and/or vector processing configuration routine 456) and executed by those ones of vector 206(1)-206(*n*) not utilized for pixel processing routines 466 or video analytics primitives 468, so that available vector processing resources (e.g., available ones of vector processors 206(1)-206(*n*) and local memories 208(1)-208(*n*)) may be utilized. It is also contemplated that an infrared camera module implementing system 100 may be supplied together with pixels processing routines 466 to enable infrared video/image processing, while end-users, system integrators (e.g., manufacturers of specific devices using the infrared camera module), or other downstream users may further customize the infrared camera module to perform desired video analytic primitives 468 and/or other data processing primitives with remaining vector processing resources.

Thus, as also described herein, pixel processing may be performed by different independent vector processors 206(1)-206(*n*) to produce an output video/image, and optionally to process other data. In this regard, pixels and other data may be accessed and/or modified by different independent vector processors 206(1)-206(*n*) as pixels are received and processed in main electronics block 102. Other components of main electronics block 102, including general-purpose processor 212, sensor interface circuit 202, sensor interface circuit 204, DMA engines 214, hardwired processing block 220, and/or other components, may also access and/or modify pixels and other data as described herein above.

As may be recognized by one skilled in the art, such accesses and/or modifications by multiple independent components may require synchronization (e.g., serialization). Accordingly, in various embodiments, various software and/or hardware synchronization primitives 470 may be provided for the various software components of main electronics block 102 to synchronize (e.g., serialize) their accesses and/or modifications to pixels and other data. Software implementations of such synchronization primitives may include, for example, semaphores, locks, barriers, and/or other primitives provided by operation system 450. Hardware implementation of such synchronization primitives (also referred to as hardware mutual exclusion or "mutex" primitives) may include various atomic operations, such as for example a test-and-set, compare-and-swap, or other atomic instruction, that may be provided by general-purpose processor 212 and/or vector processors 206(1)-206(*n*). Such hardware primitives may be utilized to implement software synchronization primitives, or utilized by software routines directly to achieve mutual exclusion.

System 100 may therefore include main electronics block 102 having various software components configured according to software architectures (e.g., software layers 400) described above for various embodiment. Such software components may facilitate efficient, scalable, and flexible pixel processing by various components of main electronics block 102, as detailed herein above. It will be appreciated that various software components described herein for software layers 400 may be combined into larger components or separated into sub-components without departing from the spirit of the present disclosure. It will also be appreciated that various software components described herein for software layers may be implemented using hardware, or combinations of hardware and software, without departing from the spirit of the present disclosure.

Figure 5:
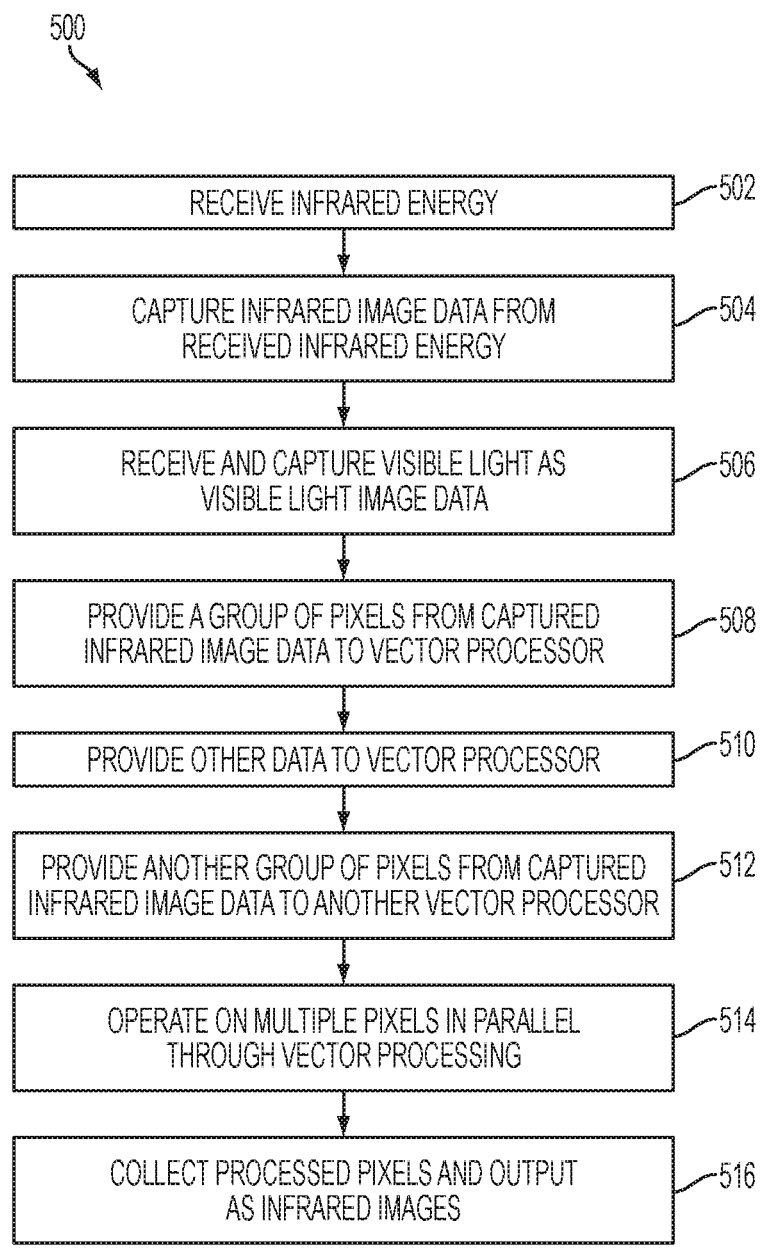
FIG. 5 illustrates a flowchart of a process to provide infrared images in accordance with an embodiment of the disclosure.

Turning now to FIG. 5, a flowchart of a process 500 to provide infrared images is illustrated in accordance with an embodiment of the disclosure. For example, all or part of process 500 may be performed by various embodiments of system 100 having main electronics block 102 with vector processing capabilities described herein above. Infrared images provided by process 500 may include, for example, infrared video and still images.

At block 502, infrared energy may be received. In various embodiments, infrared energy from a scene may be received at an FPA of infrared imaging sensor 104. In some embodiments, the infrared energy from the scene may be passed through one or more infrared optical elements (e.g., infrared optics block 106) and routed to the FPA of infrared sensor 104. In some embodiments, the infrared energy passed through infrared optics block 106 and received at the FPA of infrared imaging sensor 104 may include radiation in a thermal infrared waveband (e.g., wavelengths between 3.5 and 20 μm).

At block 504, infrared image data may be captured from the received infrared energy. For example, the infrared energy received at the FPA of infrared imaging sensor 104 may be detected by infrared detectors and converted into infrared image data by an associated ROIC as described above with reference to infrared imaging sensor 104 for various embodiments of the disclosure. The conversion into the infrared image data may in part be performed at an appropriate component, such as sensor interface circuit 202, of main electronics block 102, according to some embodiments. In accordance with various embodiments, the captured infrared image data may include a plurality of pixels represented in digital formats using a desired number of bits, as described above in connection with sensor interface circuit 202.

At block 506, visible light may be received and captured as visible light image data, in accordance with some embodiments. For example, visible light may be received at visible light imaging sensor 108 of system 100, and converted into visible light image data comprising a plurality of visible light pixels by an associated circuit of visible light imaging sensor 108 and/or by sensor interface circuit 204, as further described herein above. Block 506 may be omitted for other embodiments, for example, where visible light imaging sensor 108 is not provided.

At block 508, a group of pixels from the captured infrared image data may be provided to a vector processor (e.g., any of vector processors 206(1)-206(n)) for processing according to a pixel processing operation (e.g., for a video chain) or other pixel-level operation (e.g., for video analytics or GUI). For example, in some embodiments, a selected group of pixels may be transferred to a local memory associated with the vector processor in various manners detailed herein above in connection with local memories 208(1)-208(n), general-purpose processor 212, DMA transfer 338, and buffer management routines 454. In some embodiments, multiple pixels may be loaded onto a vector register of the vector processor as described above with respect to vector load operation 340, so that a vector operation may be carried out on the multiple pixels in parallel, for example, by vector functional units 332.

At block 510, other data may be provided to the vector processor as needed for the pixel processing operation or pixel-level operation. For example, in some embodiments, corresponding portions of calibration terms, bad pixel maps, pixel deltas and weights for distortion correction, color look up tables (LUTs), intensity transform tables (ITTs), visible light pixels (e.g., to perform blending operations), and/or other data to be used in processing the selected group of pixels may be transferred to the local memory associated with the vector processor in various manners detailed herein above in connection with local memories 208(1)-208(n), general-purpose processor 212, and buffer management routines 454. In some embodiments, appropriate data elements from such other data may be loaded onto one or more other vector registers of the vector processor as described above with respect to vector load operations 342 and 344, so that appropriate correction terms, maps, or other data fields may be applied or otherwise used as needed for the vector operation. Block 510 may be omitted for those pixel processing operations that do not require such other data.

At block 512, another group of pixels, along with other data as needed, may be provided to another vector processor (e.g., any of vector processors 206(1)-206(n) other than the vector processor referenced at block 508) for processing according to a pixel processing operation or other pixel-level operation. As detailed above with reference to vector processors 206(1)-206(n), multi-vector processor architectures for main electronics block 102 according to some embodiments may permit a vertical and/or horizontal extension of a pixel processing pipeline, as well as parallel execution of pixel processing and other pixel-level operations. Thus, some embodiments of process 500 may involve transferring another group of pixels, and other data as needed, to a local memory associated with the other vector processor as described herein above with reference to local memories 208(1)-208(n), general-purpose processor 212, DMA transfer 338, and buffer management routines 454. As may be appreciated, block 512 may be repeated depending on the availability of multiple vector processors and the desired level of parallel execution by the multiple vector processors. Conversely, block 512 may be omitted if no multiple vector processors are available and/or if parallel execution by multiple vector processors is not desired.

At block 514, multiple pixels may be operated on in parallel through vector processing. For example, as described above for vector processors 206(1)-206(n)/306, various pixel processing operations, such as for example offset and gain correction, bad pixel replacement, AGC, distortion correction, image blending, resolution enhancement, or video/image transcoding, or various pixel-level operations for video analytics or GUI, may be performed in parallel on multiple pixels stored in vector registers (e.g., vector register 330A) by utilizing vector functional units 332. For embodiments in which multiple vector processors may be utilized, the multiple vector processors may each operate on their respective group of pixels in parallel through vector processing, thereby exploiting both pixel-level and thread-level parallelism, for example.

At block 516, the processed pixels may be collected and output as infrared images. More specifically for some embodiments, pixels processed by one or more of vector processors 206(1)-206(n) may be combined, formatted, and/or otherwise aggregated into one or more infrared image/video frames (or infrared-visible light blended image/video frames if a blending operation is performed). The generated infrared image/video frames may then be output, for example, to display screen 116, non-volatile memory 112 such as a flash ROM, and/or other external devices via PAN module 120, wireless communication module 122, wired communication module 124, USB connector module 126, and/or other peripherals via peripheral interface block 218.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An infrared imaging system comprising:
an infrared imaging sensor configured to provide infrared image data comprising a plurality of pixels; and a main electronics block implemented as a system-on-a-chip (SOC) and comprising:
  a sensor interface circuit configured to receive the infrared imaging data from the infrared imaging sensor;
  a plurality of vector processors configured to operate in parallel on respective vector arrays, wherein each vector processor of the plurality of vector processors comprises vector functional units configured to selectably provide a number of lanes for processing the respective vector arrays associated with the vector processor; and
  at least one local memory communicatively coupled to the plurality of vector processors, the at least one local memory being addressable and directly accessible by the plurality of vector processors to store and access at least a portion of the infrared image data comprising the plurality of pixels;
  wherein a first vector processor of the plurality of vector processors is configured to execute a first set of vector instructions on the plurality of pixels and accessed from the at least one local memory to perform one or more operations of a video processing chain for the infrared image data; and
  wherein a second vector processor of the plurality of vector processors is configured to execute a second set of vector instructions on the plurality of pixels accessed from the at least one local memory to perform one or more operations of video analytics for the infrared image data, the second set of vector instructions being different from the first set of vector instructions.

2. The infrared imaging system of claim 1, wherein:
the at least one local memory comprises a plurality of local memories each assigned to one or more of the vector processors; and
the main electronics block further comprises a general-purpose processor configured to:
  selectively enable or disable each of the plurality of vector processors; and
  manage data flow to the plurality of local memories.

3. The infrared imaging system of claim 2, wherein the main electronics block further comprises a peripheral interface block configured to facilitate communications between the general-purpose processor and one or more peripheral devices.

4. The infrared imaging system of claim 2, further comprising a global memory communicatively coupled to the main electronics block and configured to store the infrared image data, wherein:
the main electronics block further comprises a direct memory access (DMA) engine responsive to DMA transfer requests from the general-purpose processor; and
the general-purpose processor is configured to manage data flow to the plurality of local memories by requesting the DMA engine to perform a DMA transfer of at least a portion of the infrared image data from the global memory to at least one of the plurality of local memories.

5. The infrared imaging system of claim 2, wherein:
a first local memory of the plurality of local memories is communicatively coupled to the first vector processor;
a second local memory of the plurality of local memories is communicatively coupled to the second vector processor;
the first vector processor is configured to access the plurality of pixels from the first local memory;
the second vector processor is configured to access the plurality of pixels from the second local memory; and
the general-purpose processor is configured to manage data flow to and/or between the first and second local memories.

6. The infrared imaging system of claim 1, wherein:
the first set of vector instructions associated with the first vector processor for performing one or more operations of the video processing chain includes instructions for performing offset correction, gain correction, bad pixel replacement, automatic gain control, and/or optical distortion correction on a group of pixels among the plurality of pixels in parallel.

7. The infrared imaging system of claim 1, wherein a third vector processor of the plurality of vector processors is configured to execute a third set of vector instructions to perform one or more operations of an image/video resolution enhancement.

8. The infrared imaging system of claim 1, further comprising a visible light imaging sensor configured to provide visible light image data, wherein a third vector processor of the plurality of vector processors is configured to execute a third set of vector instructions to perform one or more operations of infrared and visible light image data blending.

9. The infrared imaging system of claim 1, wherein the at least one local memory is a shared local memory for the plurality of vector processors.

10. The infrared imaging system of claim 1, wherein:
the plurality of pixels is provided as a plurality of groups of pixels;
for each group of pixels, the first vector processor is configured to execute the first set of vector instructions on the group of pixels in parallel with the second vector processor executing the second set of vector instructions on another group of pixels; and
each of the plurality of pixels is processed by both the first vector processor and the second vector processor.

11. A method of providing infrared images, the method comprising:
converting received infrared energy into infrared image data comprising a plurality of pixels;
receiving the infrared image data at a system-on-a-chip (SOC) via a sensor interface circuit of the SOC, wherein the SOC comprises a plurality of vector processors configured to operate in parallel on respective vector arrays and at least one local memory communicatively coupled to the plurality of vector processors, wherein each vector processor of the plurality of vector processors comprises vector functional units configured to selectably provide a number of lanes for processing the respective vector arrays associated with the vector processor;
providing, to at least one vector processor of the plurality of vector processors, the plurality of pixels of the infrared image data by directly addressing and accessing at least a portion of the infrared image data comprising the plurality of pixels from the at least one local memory;
executing a first set of vector instructions by a first vector processor of the plurality of vector processors on the plurality of pixels and accessed from the at least one local memory to perform one or more operations of a video processing for the infrared image data; and
executing a second set of vector instructions by a second vector processor of the plurality of vector processors on the plurality of pixels accessed from the at least one local memory to perform one or more operations of video analytics for the infrared image data, the second set of vector instructions being different from the first set of vector instructions.

12. The method of claim 11, wherein:
the at least one local memory comprises a plurality of local memories each assigned to one or more of the vector processors; and
the method further comprises managing data flow to the plurality of local memories by a general-purpose processor.

13. The method of claim 12, wherein the providing the plurality of pixels comprises:
transferring the plurality of pixels to a first local memory of the plurality of local memories, the first local memory communicatively coupled to the first vector processor; and
transferring the plurality of pixels to a second local memory of the plurality of local memories, the second local memory communicatively coupled to the second vector processor.

14. The method of claim 12, wherein the managing of the data flow to the plurality of local memories comprises transferring, by a direct memory access (DMA) engine, the at least a portion of the infrared image data from a global memory to at least one of the plurality of local memories in response to a DMA transfer request from the general-purpose processor.

15. The method of claim 11, wherein:
the first set of vector instructions executed by the first vector processor to perform one or more operations of the video processing chain includes instructions for performing offset correction, gain correction, bad pixel replacement, automatic gain control, and/or optical distortion correction on a group of pixels among the plurality of pixels in parallel.

16. The method of claim 11, further comprising executing a third set of vector instruction by a third vector processor of the plurality of vector processors to perform one or more operations of an image/video resolution enhancement.

17. The method of claim 11, further comprising:
converting received visible light into visible light image data; and
executing a third set of vector instruction by a third vector processor of the plurality of vector processors to perform one or more operations of infrared and visible light image data blending.

* * * * *

UNITED STATES PATENT AND TRADEMARK OFFICE
CERTIFICATE OF CORRECTION

PATENT NO. : 10,070,074 B2  
APPLICATION NO. : 15/017448  
DATED : September 4, 2018  
INVENTOR(S) : Pierre Boulanger and Randy Roberts Page 1 of 1

It is certified that error appears in the above-identified patent and that said Letters Patent is hereby corrected as shown below:

In the Specification

In Column 13, Line 27, change "may is suitably" to --may suitably--.

Signed and Sealed this  
Sixteenth Day of October, 2018

Andrei Iancu  
*Director of the United States Patent and Trademark Office*